US005278761A

United States Patent [19]

Ander et al.

[11] Patent Number: 5,278,761

[45] Date of Patent: Jan. 11, 1994

[54] METHOD FOR VEHICULAR WHEEL SPIN CONTROL THAT ADAPTS TO DIFFERENT ROAD TRACTION CHARACTERISTICS

[75] Inventors: Anthony T. Ander, Plymouth; Davorin Hrovat; Craig J. Simonds, both of Dearborn; Lee-Fei Chen, Ann Arbor, all of Mich.

[73] Assignee: Ford Motor Company, Dearborn, Mich.

[21] Appl. No.: 974,756

[22] Filed: Nov. 12, 1992

[51] Int. Cl.$^5$ .......... B60K 41/20; B60L 3/10

[52] U.S. Cl. .......... 364/426.03; 180/197; 364/426.01

[58] Field of Search .......... 364/426.03, 426.01; 180/197

[56] References Cited

U.S. PATENT DOCUMENTS

| | | | |
|---|---|---|---|
| 3,921,446 | 11/1975 | Ludloff | 73/136 |
| 4,680,959 | 7/1987 | Henry et al. | 73/117 |
| 4,712,635 | 12/1987 | Sumiya et al. | 180/197 |
| 4,733,760 | 3/1988 | Inagaki et al. | 192/3 R |
| 4,758,967 | 7/1988 | Shmuter et al. | 364/550 |
| 4,985,838 | 1/1991 | Hashiguichi et al. | 364/426.02 |
| 5,033,002 | 7/1991 | Sol | 364/426.03 |
| 5,090,511 | 2/1992 | Kabasin | 180/197 |
| 5,159,991 | 11/1992 | Tsuyama et al. | 180/197 |
| 5,164,902 | 11/1992 | Kopper et al. | 364/426.02 |
| 5,193,888 | 3/1993 | Okazaki et al. | 303/93 |

OTHER PUBLICATIONS

"Development of New Control Methods to Improve Response of Throttle Type Traction Control System" by Igata et al., SAE Technical Paper Series 920608, Feb. 24, 1992.

*Primary Examiner*—Thomas G. Black
*Assistant Examiner*—Julie D. Day
*Attorney, Agent, or Firm*—Damian Porcari; Roger L. May

[57] ABSTRACT

Techniques for controlling the spin of driven wheels of a vehicle being driven over a surface, the vehicle also including nondriven wheels and an engine having a fuel system for varying engine torque. A characteristic signal representative of at least an estimate of the value of a traction characteristic of a surface under the vehicle is generated. A drive signal having a value dependent on the value of the characteristic signal is then generated. The engine torque is varied in response to the drive signal in order to control the spin of the driven wheels of the vehicle.

20 Claims, 6 Drawing Sheets

14
10
18
36
34
63
65
46
42
32
44
ENGINE
Wa
47
12
45
26
22
30
28
40
48
37
70
66
64
16
20
74
50
CONTROLLER
78
80

1
118
iFLAG1 = 1?
N (normal)
Y
120
MK = PTERM + ITERM0 + DTERM
122
Is TAP > gas pedal equivalent position?
N
Y
124
iFLAG1 = 0
126
Mu_Est > Mu_L1?
Y (not on ice)
128
iFLAG2 = 1
N (on ice)
do not use ATC
132
do abrupt throttle closing (ATC)
Y
130
iFLAG2 = 0?
134
iFLAG2 = 1
(ATC done)
N
138
MK = DFPS
136
Update SLIPER
END
140

Inputs:
Torque_Estimated
Steering_Angle
Wheel Speeds
200
Mu_temporary =
Torque_Estimated/Load on driven wheels
210
Set Initial Mu$_o$
Calculate Slip Limit S$_1$ =
Constant + Steering Angle * Factor
Calculate Wheel Slip
220
230
Is Slip > S$_1$?
N
Y
250
Is Mu$_{temp}$ > Mu$_{last-est}$ ?
N
Y
240
260
270
Mu$_{est}$ = Mu$_{temp}$
Mu$_{est}$ = Mu$_{temp}$
Mu$_{est}$ = Mu$_{last-est}$

METHOD FOR VEHICULAR WHEEL SPIN CONTROL THAT ADAPTS TO DIFFERENT ROAD TRACTION CHARACTERISTICS

FIELD OF THE INVENTION

This invention is directed to techniques for controlling the spin of drive wheels of a vehicle. More particularly, the invention is directed to such techniques in which engine torque is adjusted to control wheel spin.

BACKGROUND OF THE INVENTION

Those who drive vehicles on ice, snow or loose gravel frequently have trouble controlling the spin of the vehicle's driven wheels. Such surfaces have a relatively low coefficient of friction which substantially reduces the traction between the driven wheels and the road surface. As a result, even a small amount of torque applied to the driven wheels tends to cause them to spin. If the spin becomes severe, the vehicle can be difficult to control.

As far as the applicants are aware, there is no known technique for accurately controlling the wheel spin of a moving vehicle by varying engine torque in proportion to an estimated traction characteristic of the surface under the vehicle. A recent paper which refers to limited use of a surface adhesion coefficient in order to improved traction control is entitled "Development of New Control Methods to Improve Response To Throttle Type Traction Control System," by Hiroshi Igata et al., reprinted from *Transmission and Driveline Symposium: Components, Gears and CAE,* (SP-905), bearing the legend "International Congress & Exposition, Detroit, Mich., Feb. 24–28, 1992," available as SAE Technical Paper Series No. 920608. Page 4 of the paper states that the surface adhesion coefficient can be calculated from the acceleration of the nondriven wheels of a vehicle. The paper also states that if the adhesion coefficient is sufficiently high, throttle feedback gain can be increased without the occurrence of throttle hunting, and therefore, feedback gain should be determined according to the calculated adhesion coefficient. According to Igata et al., the adhesion coefficient merely serves to determine whether such feedback can be increased. Page 5 of the paper suggests that the calculated adhesion coefficient should not be revised to a lower value unless wheel slip exceeds a predetermined level. Page 3 of the paper indicates that an initial value of throttle feedback should be a function of adhesion coefficient and engine speed.

Contrary to the limited use of adhesion coefficient suggested by Igata et al., the applicants have discovered that improved wheel spin control can be achieved by varying engine torque in a manner which may be dependent or independent of the value of a traction characteristic of a surface under the vehicle, such as coefficient of friction, depending on the value of the characteristic.

SUMMARY OF THE INVENTION

According to a first aspect of the invention, the applicants control the spin of the driven wheels of a vehicle being driven over a surface. The vehicle also includes nondriven wheels and an engine having a fuel system for varying engine torque by varying fuel-air flow rate. In such a vehicle, the applicants generate a characteristic signal representative of at least an estimate of the value of a traction characteristic of the surface under the vehicle. A drive signal then is generated having a value dependent on the value of the characteristic signal for a first range of values of the characteristic signal and independent of the value of the characteristic signal for a second range of values of the characteristic signal. The engine torque is varied in response to the drive signal so that the spin of the drive wheels is controlled.

According to a second aspect of the invention, in addition to generating the characteristic signal, a first decision signal is generated if the value of the characteristic signal is increasing, and a second decision signal is generated if the value of the characteristic signal is decreasing. A first boundary signal representative of a first boundary value between first and second ranges of values of the traction characteristic of the surface is generated. Preferably, the values in the second range are greater than the values in the first range. First and second band signals, respectively, having a first predetermined band value less than the first boundary value and a second predetermined band value greater than the first boundary value are generated. A drive signal is then generated having a value depending on a predetermined relationship among the values of the characteristic signal, first decision signal, second decision signal, first band signal, and second band signal. The engine torque then is varied in response to the drive signal so that the spin of the driven wheels is controlled while chattering is reduced.

Use of the foregoing techniques offers a significant advantage in wheel spin control. By estimating the traction characteristic of the surface under the vehicle in real time and varying the engine torque in proportion to the value of the traction characteristic, wheel spin can be controlled over a wide range of road surface conditions. Spin control is smooth and responsive to rapid changes in road surface conditions while any tendency to chatter is substantially reduced.

BRIEF DESCRIPTION OF THE DRAWINGS

The detailed description of certain preferred embodiments of the invention is provided below with reference to the accompanying drawings, wherein the same reference numeral is used for a given feature in all figures.

DETAILED DESCRIPTION OF CERTAIN PREFERRED EMBODIMENTS

Figure 1:
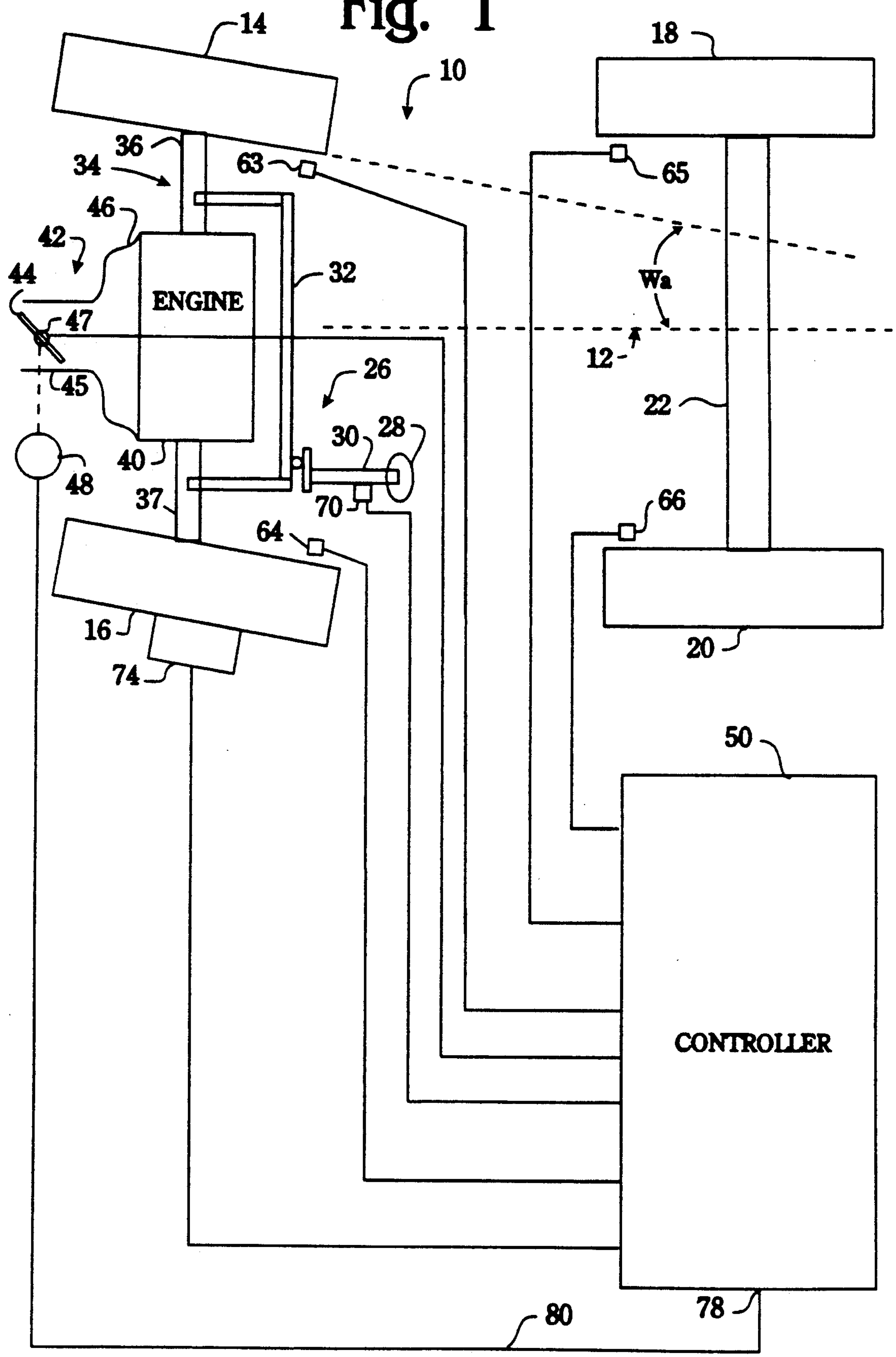
FIG. 1 is a fragmentary, schematic view of an exemplary automobile chassis in which a preferred form of the present invention may be used to advantage.

Referring to FIG. 1, a preferred form of the invention may be used to advantage in an exemplary front wheel drive vehicle 10 defining a longitudinal axis 12. The vehicle includes driven wheels 14 and 16, as well as nondriven wheels 18 and 20. Wheels 18 and 20 turn on a common axle 22. The wheels also could be independently suspended. A steering assembly 26 comprises a steering wheel 28 supported by a conventional steering column 30. The steering column is linked to a front axle 34 by a conventional steering linkage 32. Front axle 34 includes half axles 36 and 37 that supply power to driven wheels 14 and 16 through a conventional differential (not shown).

Vehicle 10 also includes an engine 40, including a fuel system 42 for varying the engine fuel-air flow rate from a maximum rate to an idle rate in order to control the torque of the engine. Thus, the engine torque also is varied from a maximum value to an idle value. The flow rate can be altered by varying the angle of a throttle 44 that is fitted in the throat 45 of an air intake manifold 46 of a fuel injection system (not shown). The throttle angle is changed by an electric motor 48 that is responsive to a drive signal and is measured by an angle transducer 47.

Still referring to FIG. 1, a preferred form of the present invention includes a conventional electronic microprocessor or controller 50 that may be implemented by the electronic engine controller (EEC) manufactured by Ford Motor Company. Inputs to controller 50 are supplied by wheel speed sensors 63–66 for sensing the angular speed of wheels 14, 16, 18 and 20, respectively. An input also is provided from throttle angle transducer 47. A conventional steering angle transducer 70 may be mounted on steering column 30 in order to provide a signal proportional to the steering angle through which steering wheel 28 is moved. One of the driven wheels, such as wheel 16, may be fitted with a commercially available torque sensor 74 for providing a signal proportional to the amount of torque applied to driven wheels 14 and 16. Torque sensor 74 may be a model manufactured by Lucas Schaevitz Company.

Controller 50 has an output port 78 that transmits the drive signal over a conductor 80 to motor 48. EEC 50 is programmed to update the value on conductor 80 approximately every 20 milliseconds.

Rather than using torque sensor 74, those skilled in the art will recognize that the torque applied to driven wheels 14 and 16 can be estimated by a variety of microprocessor techniques. Exemplary techniques are shown in the following U.S. patents:

| U.S. Pat. No. | Inventor | Issue Date |
|---|---|---|
| 3,921,446 | Ludloff | November 25, 1975 |
| 4,680,959 | Henry et al. | July 21, 1987 |
| 4,758,967 | Shmuter et al. | July 19, 1988 |
| 4,985,838 | Hashiguchi et al. | January 15, 1991 |

A preferred form of torque estimation is described and claimed in co-pending application entitled "Robust Torque Estimation Using Multitudes Of Models" assigned to the Ford Motor Company and filed in the names of Davorin Hrovat and Lee-Fei Chen on the same date as the present application.

After the torque is known, the tractive force applied to the driven wheels is calculated. The method of calculation is well known to those skilled in the art.

EEC 50 is programmed to perform the method steps described in connection with FIGS. 2 and 3. The method begins with step 100 which initiates the cycle of operation shown in FIGS. 2 and 3 approximately every 20 milliseconds.

Figure 2:
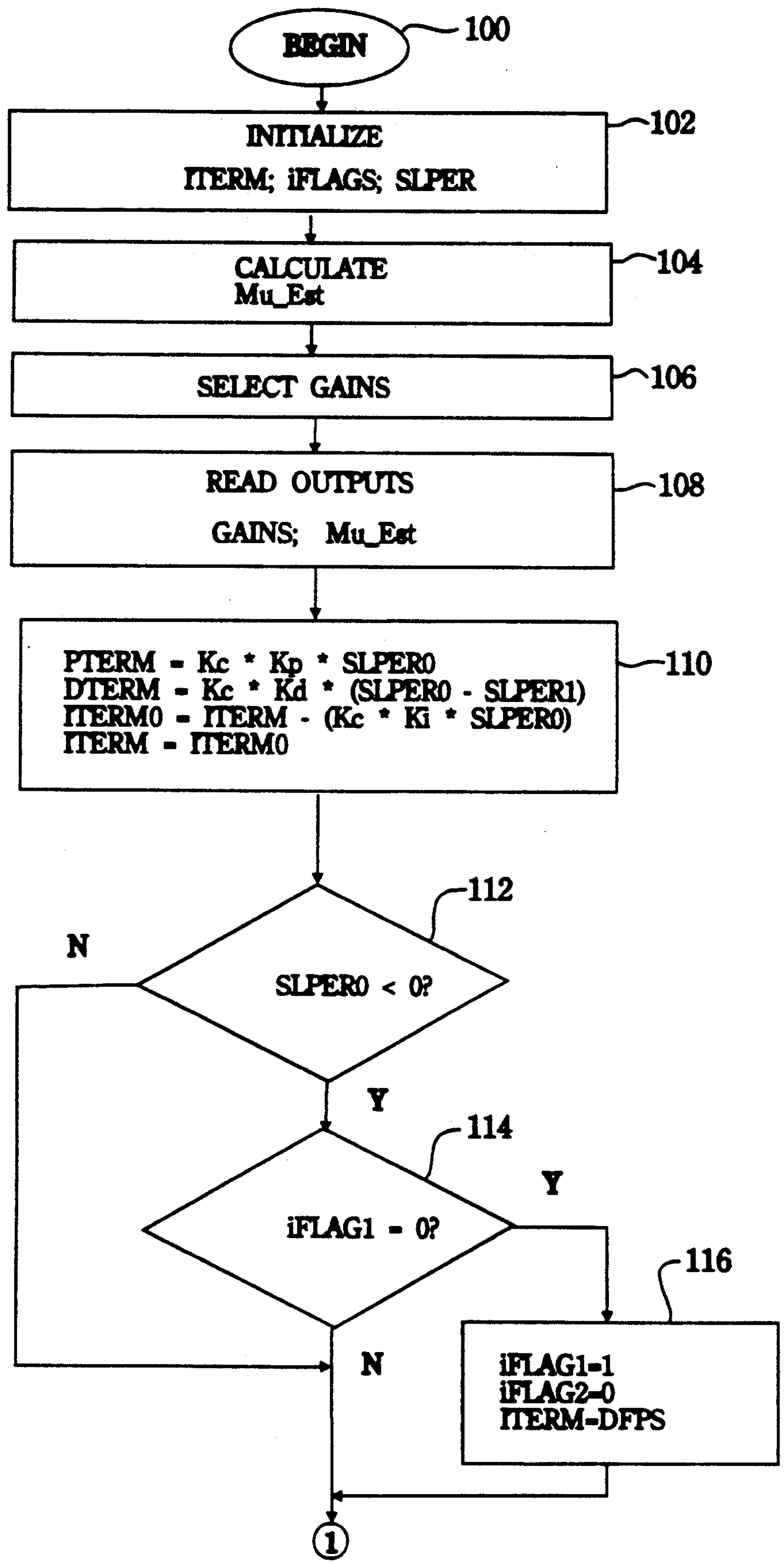
FIGS. 2 and 3 are flow diagrams illustrating the operation of an exemplary controller operating in accordance with a preferred embodiment of the present invention in order to control the spin of driven wheels.

Referring to FIG. 2, step 102, certain variables are initialized, including ITERM and iFLAGS. Initially, iFLAG1 and iFLAG2 are both set equal to 0. iFLAG1=1 indicates an anti-wheel spin mode of operation. iFLAG2=1 indicates an abrupt throttle control mode of operation described hereafter.

Referring to FIG. 2, step 102, a preferred form of the present invention periodically generates a slip error signal (SLPER). In order to generate SLPER, the signals from sensors 63 and 64 indicating the angular speed of front driven wheels 14 and 16 are processed in order to generate a first speed signal representative of the average angular speed of front wheels 14 and 16. The signals from sensors 65 and 66 that represent the angular speed of nondriven rear wheels 18 and 20 are averaged in order to generate a second speed signal representative of the angular speed of the nondriven rear wheels. Control unit 50 is programmed to generate a slip signal proportional to the difference between the angular speed of the driven wheels and the angular speed of the nondriven wheels. That is, the slip signal is proportional to the value of the first speed signal minus the value of the second speed signal.

A memory location in unit 50 stores a desired slip signal representing a desired difference between the angular speed of the driven wheels and the angular speed of the nondriven wheels (i.e., a desired difference between the values of the first and second speed signals). This is an important feature which enables the system to automatically provide some tractive force by the driven wheels while controlling excessive spin. Slip error signal SLPER is proportional to the difference between the value of the slip signal and the value of the desired slip signal.

Those skilled in the art will recognize that the slip error signal (SLPER) is calculated at predetermined points in time that are separated by a predetermined and fixed time duration. Preferably, the slip error signal is recalculated during each calculation cycle of unit 50, i.e., about every 20 milliseconds. The slip error signal for the current calculation cycle is indicated by SLPER0.

In step 104, EEC 50 calculates an estimate of the coefficient of friction of the surface under vehicle 10 (Mu_Est). The details of the calculation are described in FIG. 4.

In step 106, gain variables are selected according to the value of Mu_Est. Details of the gain selection are described in connection with FIG. 5.

In step 108, EEC 50 reads the selected gains and the value of Mu_Est.

Referring to step 110, the value PTERM is set equal to a control gain constant Kc multiplied by another control gain constant Kp multiplied by the current slip error value (SLPER0). As a result, PTERM is proportional to the slip error value. Derivative value DTERM is set equal to control gain constant Kc multiplied by another control gain constant Kd multiplied by the difference between the slip error value for the current calculation cycle (SLPER0) and the slip error value for the preceding calculation cycle (SLPER1). Those skilled in the art will recognize that DTERM is at least approximately proportional to the derivative of the slip error value taken as a function of time. This is an important feature which enables improved wheel spin control by proper positioning of throttle valve 44 (FIG. 1).

Still referring to step 110, current integral term ITERM0 is set equal to the stored value of ITERM from the preceding calculation cycle (ITERM1) minus a term consisting of a control gain constant Kc multiplied by another control gain constant Ki multiplied by the current slip error value (SLPER0). The value of ITERM1 is then set equal to the current ITERM value (ITERM0). The gains selected in step 106 correspond to the Kc, Kp, Kd and Ki constants described in step 110. Thus, PTERM, DTERM and ITERM are each influenced by Mu_Est.

Those skilled in the art will recognize that the repeated calculation of ITERM over time is at least approximately proportional to the integral of the slip error taken as a function of time. The number of cycles over which the value ITERM is accumulated can be varied depending on the accuracy of the integral desired and the particular application intended.

In step 112, EEC 50 determines whether the value of current slip error signal (SLPER0) is less than 0. If so, anti-wheel spin mode of operation is initiated by setting iFLAG1 equal to 1. If SLPER0 is not less than 0 and iFLAG1 equals 0, then the normal operation is initiated. Step 112 is a decision step that asks a question. Several other decision steps are shown in the drawings. For each decision step, an affirmative answer is indicated by Y and a negative answer is indicated by N.

As shown in steps 114 and 116, if iFLAG1 equals 0, then iFLAG1 is set equal to 1 and iFLAG2 is set equal to 0. In addition, the variable ITERM is set equal to a variable DFPS which indicates the position of the accelerator pedal in vehicle 10 (not shown).

Figure 3:
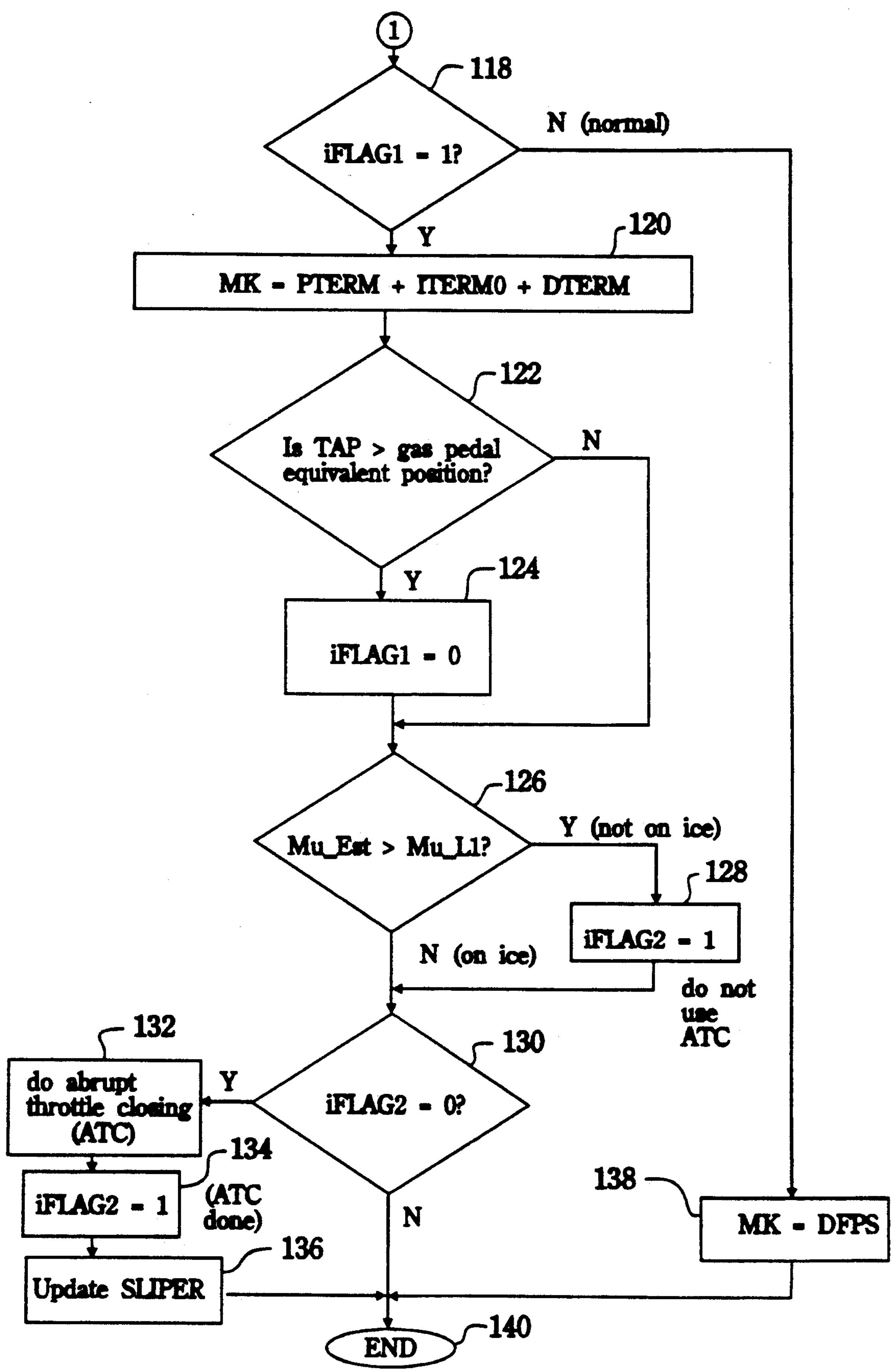

Referring to FIG. 3, in step 118, EEC 50 determines whether iFLAG1 equals 1. If not, the vehicle is operating in its normal mode and variable DFPS is used in step 138 to set the value which determines the position of throttle 44. In other words, in the normal mode of operation, the driver of the vehicle directly controls the throttle angle of throttle 44 by moving the accelerator pedal.

Referring again to step 118, if iFLAG1 equals 1, then MK is set equal to the sum of PTERM plus ITERM plus DTERM. This is an important feature which enables the throttle angle of throttle 44 to be made dependent on the value of Mu_Est. MK results in a drive signal on conductor 80 that enables motor 48 to control the angle of throttle 44 (FIG. 1) as a function of the value of the surface coefficient of friction estimate Mu_Est.

In step 122, the throttle angle position (TAP) is compared with the gas pedal equivalent position. The throttle angle position is the angle of throttle 44. The angle is an input to EEC 50. The gas pedal equivalent position (DFPS) is related to the desired throttle angle position by a table stored in the memory of EEC 50. For every value of DFPS, the table generates a desired throttle angle position value which indicates the angle of throttle 44 which will result in the engine power demanded by the position of the accelerator pedal being operated by the driver. If the question posed by decision step 122 is answered yes, it means that the actual setting of the throttle angle calls for more engine power than the power requested by the driver. In this case, the driver has reduced his demand for engine power, and there is no need for an anti-wheel spin mode of operation. As a result, iFLAG1 is set equal to 0 in step 124.

In step 126, EEC 50 checks to see whether the value of Mu_Est is greater than Mu_L1. The value of Mu_L1 is shown as the Mu Ice-Snow boundary value in FIG. 6. If the answer to the question posed in step 126 is no, then the vehicle is judged to be on ice, and EEC 50 checks in step 130 to determine whether the abrupt throttle closing feature previously has been initiated. If iFLAG2 equals 0, then the abrupt throttle closing feature has not been initiated, and it is performed in step 132. The abrupt throttle closing feature results in a signal on conductor 80 which causes motor 48 to rapidly close throttle 44 to the idle position so that engine torque is rapidly reduced to an idle value. This is an important feature which enables wheel spin to be rapidly reduced when a rapid wheel spin condition initially is sensed.

In step 134, iFLAG2 is set equal to 1 indicating that the abrupt throttle closing has been accomplished. This is an important feature which prevents the abrupt throttle closing from being used more than once in a single operating cycle. It has been found that this feature prevents chattering and surging which otherwise would occur if the abrupt throttle closing feature were used repeatedly over short time intervals.

In step 136, the SLPER value referred to in steps 102 and 110 is updated.

Referring again to step 126, if the vehicle is judged not to be on ice, then iFLAG2 is set equal to 1 in step 128 so that the abrupt throttle closing feature will not be initiated.

Referring to step 140, the method which is the subject of the preferred embodiment temporarily ends. However, those skilled in the art will recognize that the method shown in FIGS. 2 and 3 must be repeatedly executed in real time in order to result in proper operation. It has been found that executing the method in FIGS. 2 and 3 approximately every 20 milliseconds is sufficient.

EEC 50 is programmed to perform step 104 by means of the method steps described in connection with FIG. 4 in order to estimate the coefficient of friction of the surface over which vehicle 10 is driven. In step 200, the value of a torque signal representative of at least an estimate of the amount of the torque applied to driven wheels 14 and 16 is stored in the memory of EEC 50 at memory location Torque_Estimated. The torque signal can be generated either by torque sensor 74 or a program for estimating torque of the type previously described. A steering angle signal representative of the steering angle of steering wheel 28 is generated by steering angle transducer 70 and is stored in the memory of EEC 50 at memory location Steering_Angle. Speed signals representative of the angular speed of the wheels are received from sensors 63-66 and are stored in the memory of EEC 50. At a memory location Load, EEC 50 stores a value of a load signal representative of an estimate of the force applied to driven wheels 14 and 16 by the weight of vehicle 10 during normal operations.

EEC 50 generates a first speed signal representative of the angular speed of the driven wheels by averaging the speed signals received from sensors 63 and 64. EEC 50 generates a second speed signal representative of the angular speed of the nondriven wheels by averaging the value of the speed signals received from sensors 65 and 66, respectively.

In step 210, a current estimate of the coefficient of friction of the surface under vehicle 10 is estimated by having EEC 50 divide the value of the torque signal or, more precisely, the value of a tractive force signal by the value of the load signal. The torque signal and load signal are generated from the corresponding values stored in memory. The value of the signal resulting from the division is stored in a memory location $Mu_{temp}$ as a current but temporary estimate of the coefficient of friction of the surface under the vehicle. The calculation of the $Mu_{temp}$ value is an important feature which provides an accurate estimate of the current coefficient of friction of the surface under the vehicle after processing by the other operating parts of the program described in steps 220-270.

In step 220, an initial coefficient of friction value, $Mu_o$ is calculated by setting the value to approximately 0.8-0.9. The range of the coefficient of friction according to the preferred embodiment is 0.0-1.0.

In step 220, a slip limit signal $S_l$ representative of a predetermined value of slippage between the driven wheels and the nondriven wheels is calculated. Signal $S_l$ is equal to a constant plus the value of the steering angle signal from transducer 70 multiplied times a factor which includes conversion of the steering angle signal into a wheel angle signal representative of the angle between the steerable pair of wheels 14 and 16 and longitudinal axis 12. In FIG. 1, the steering wheel angle is shown by the angle Wa.

Figure 4:
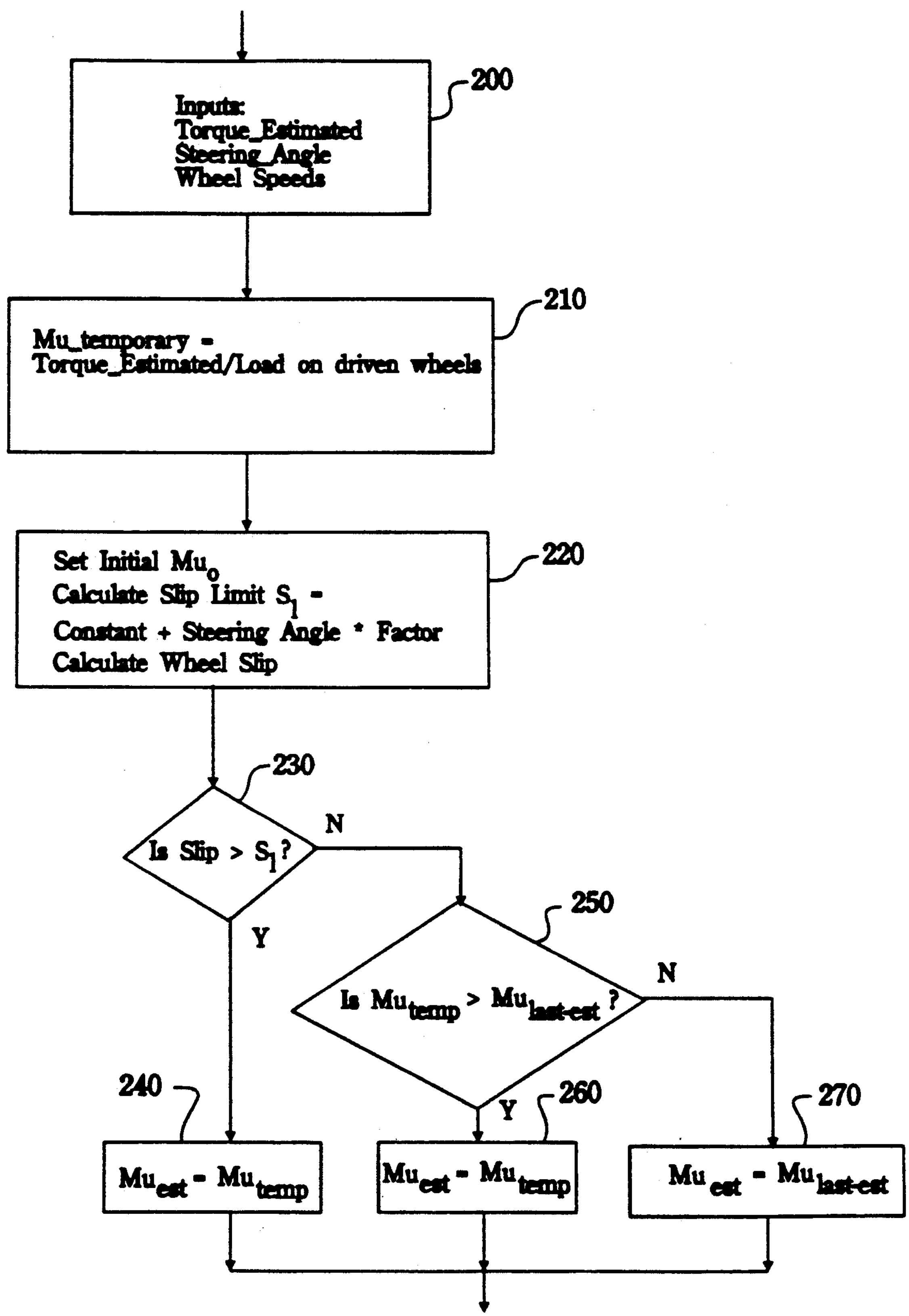
FIG. 4 is a flow diagram illustrating details of one of the steps shown in FIG. 2.

In step 220 of FIG. 4, a wheel slip signal (Slip) is generated by calculating the absolute value of the difference between the first speed signal and the second speed signal. Thus, the slip signal is a measure of the amount of slippage between the driven wheels and the nondriven wheels. Use of the steering angle in step 220 is an important feature that increases the accuracy of the slip limit value. The slip limit value should change when the driver of the vehicle turns the steering wheel. The tractive force generated by driven wheels 14 and 16 is reduced when steering around a corner. During cornering, the force of the wheels against the surface is divided into a tractive force component and a cornering force component. The proper value of the slip limit signal increases during cornering and is calculated in step 220.

In step 230, EEC 50 generates a first decision signal if the slip signal is greater than the value of the slip limit signal. If the value of the slip signal is not greater than the value of the slip limit signal, as shown in step 230, EEC 50 generates a second decision signal.

In response to the first decision signal, in step 240, the temporary value of the coefficient of friction stored at location $Mu_{temp}$ is transferred to memory location $Mu_{est}$ which, after each processing cycle, represents the estimated coefficient of friction of the surface under vehicle 10. This is an important feature that substantially improves the accuracy of the coefficient of friction estimate. Experience has shown that the coefficient of friction estimate made in step 210 is only accurate if the slip signal has a predetermined range of values with respect to the slip limit signal. If the slip signal has a value greater than the slip limit signal, then the temporary coefficient of friction estimate is sufficiently accurate to replace the previously stored estimate ($Mu_{ast-est}$).

As shown in step 250, in response to the second decision signal, if the temporary coefficient of friction estimate stored at location $Mu_{temp}$ is greater than the previously stored coefficient of friction estimate ($Mu_{ast-est}$), a third decision signal is generated by EEC 50. If the temporary coefficient of friction estimate is not greater than the previously stored estimate ($Mu_{ast-est}$), EEC 50 generates a fourth decision signal.

As shown in step 260, in response to the second and third decision signals, the value of memory location $Mu_{est}$ is set equal to the temporary coefficient of friction estimate calculated in step 210. This is an important feature which enables the improved accuracy of the estimate. Experience has shown that if the temporary coefficient of friction estimate is increasing, it is likely that the actual value of the coefficient of friction is increasing, even though there is insufficient wheel slippage between the driven and nondriven wheels to make the value of the slip signal greater than the value of the slip limit signal. These conditions are likely to be encountered when the vehicle is traveling from a lower coefficient of friction surface to higher coefficient of friction surface. Therefore, it is reasonable to assume that the actual value of the coefficient of friction is increasing. As a result, the temporary value of the coefficient of friction, which is greater than the last stored value, is used in step 260 for the new estimate of the actual coefficient of friction.

As shown in step 270, in response to the second and fourth decision signals, memory location $Mu_{est}$ continues to store the previous coefficient of friction estimate ($Mu_{ast-est}$), rather than the temporary estimate calculated in step 210. This is an important feature which increases the accuracy of the estimate. Experience has shown that when the slippage of the driven wheels with respect to the nondriven wheels falls below the criteria stated in step 230 and the temporary coefficient of friction estimate is not greater than the previous estimate, the previous estimate is the best estimate of the actual value of the coefficient of friction of the surface under the vehicle. Accordingly, as shown in step 270, location $Mu_{est}$ continues to store the previously stored estimate ($Mu_{ast-est}$).

EEC 50 is programmed to rapidly execute all of the steps shown in FIG. 4 and then return to repeat the steps again periodically. According to the preferred embodiment, the cycle of steps shown in FIG. 4 is repeated approximately every 20 milliseconds. This is an important feature which enables sufficiently rapid calculation in order to provide an accurate estimate of the coefficient of friction of a surface under vehicle 10 in real time.

Figure 5:
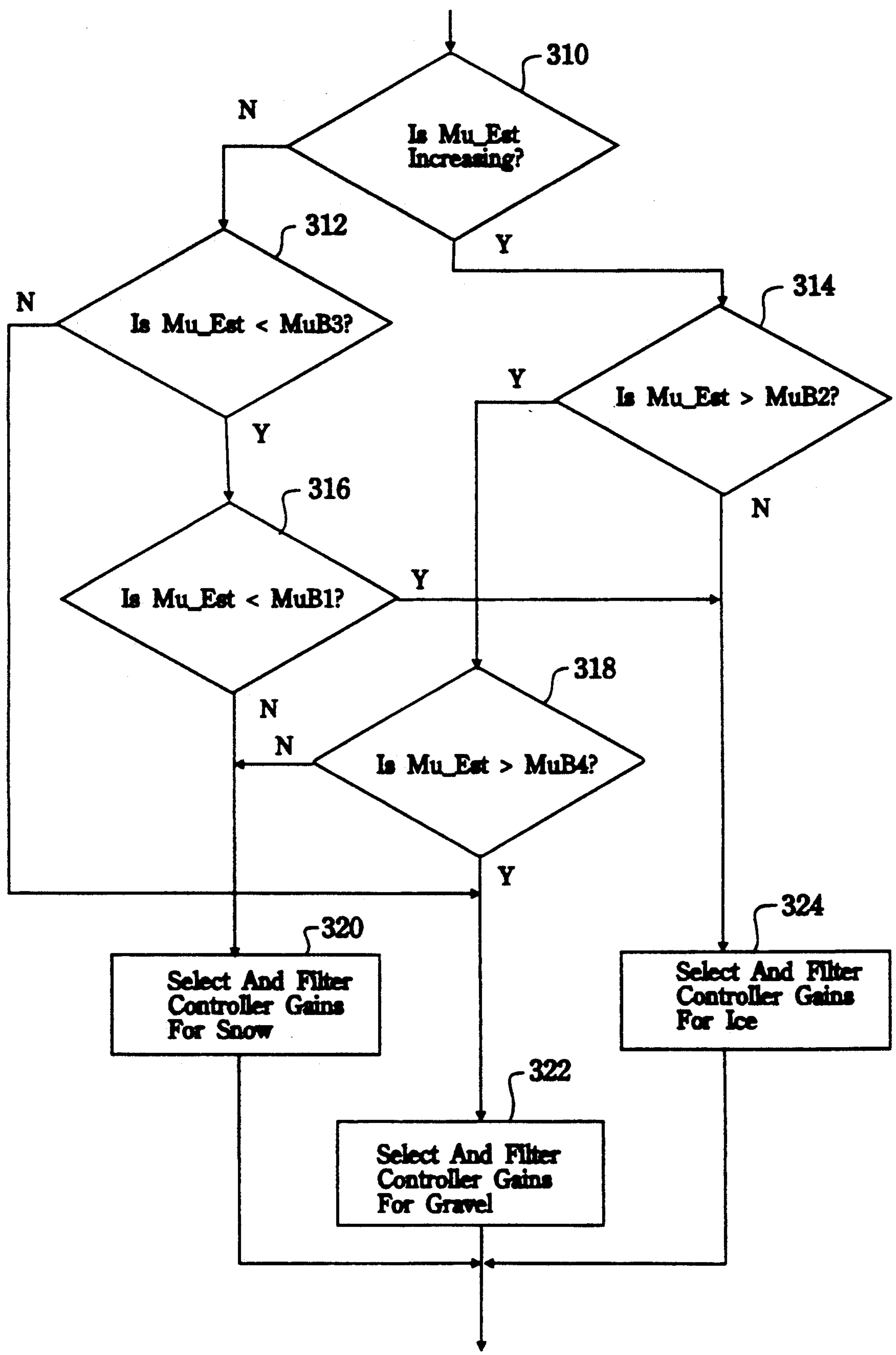
FIG. 5 is a flow diagram illustrating details of another of the steps shown in FIG. 2.

The details of the method by which step 106 shown in FIG. 2 is accomplished are illustrated in the flow chart of FIG. 5. Referring to step 310, a first decision signal is generated if Mu_Est is increasing and a second decision signal is generated if Mu_Est is decreasing. The remainder of the steps shown in FIG. 5 can be understood best with reference to FIG. 6.

Figure 6:
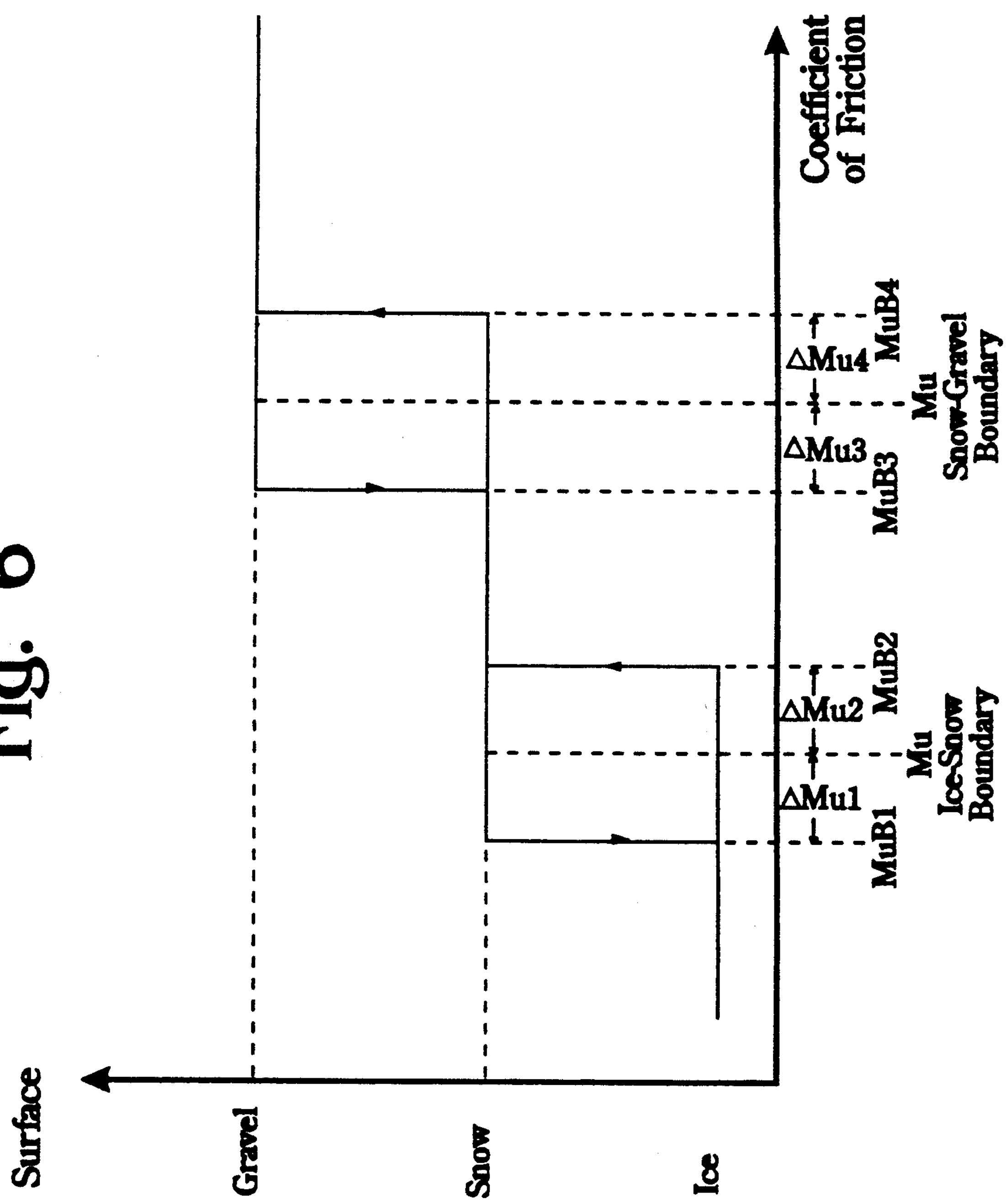
FIG. 6 is a diagram illustrating various values of coefficient of friction used in the steps illustrated in FIG. 5.

As shown in FIG. 6, the coefficient of friction values of the surface under vehicle 10 are divided into three regions separated by a Mu Ice-Snow boundary value and a Mu Snow-Gravel boundary value as shown. The ice range of values is shown to the left of the Mu Ice-Snow boundary value and the gravel range of values is illustrated to the right of the Mu Snow-Gravel boundary value. The snow range of values is between the above-identified boundary values.

EEC 50 stores four band values, MuB1, MuB2, MuB3 and MuB4. MuB1 and MuB2 are equidistant from the Mu Ice-Snow boundary value. In other words, as shown in FIG. 6, the range of values ΔMu1 and ΔMu2 are equal so that values MuB1 and MuB2 are spaced equally below and above, respectively, the Mu Ice-Snow boundary value.

As shown in FIG. 6, the ΔMu3 and ΔMu4 range of values are equal so that the MuB3 and MuB4 values are spaced equally below and above, respectively, the Mu Snow-Gravel boundary value. The values shown in FIG. 6 are an important feature which enables EEC 50 to control throttle 44 without chattering.

Returning to FIG. 5, in step 314, if the Mu_Est value is not greater than the MuB2 value, then the feedback gain for ice is selected in step 324. In step 318, if the Mu_Est value is greater than the MuB4 value and if decision block 314 was answered yes, the feedback gain for gravel is selected in step 322. If the Mu_Est value is not greater than the MuB4 value and if decision block 314 was answered yes, then the feedback gain for snow is selected in step 320.

In step 312, if the Mu_Est value is not less than the MuB3 value, the feedback gain for gravel is selected in step 322. If decision block 312 is answered yes, then decision block 316 is entered. In step 316, if the Mu_Est value is less than the MuB1 value, the feedback gain for ice is selected in step 324. In step 316, if the Mu_Est value is not less than the MuB1 value, then the feedback gain for snow is selected in step 320. The method of operation illustrated in FIG. 5 is an important feature which enables throttle 44 to be smoothly controlled without chattering.

Each of the gains referred to in steps 320, 322 and 324 of FIG. 5 are referred to by the terms Kc, Kp, Kd and Ki in FIG. 2, step 110. This is an important feature which enables step 120 (FIG. 3) to set the MK term to a value that is a function of the gains for the varied surface conditions which, in turn, are proportional to the coefficient of friction for the surface under vehicle 10.

The various preferred versions or embodiments of the invention described in detail above are intended only to be illustrative of the invention. Those skilled in the art will recognize that modifications, additions and substitutions can be made in the various features and elements of the invention without departing from the true spirit and scope of the invention. The following claims are intended to cover the true scope and spirit of the invention.

What is claimed is:

1. A method of controlling the spin of driven wheels of a vehicle being driven over a surface, said vehicle also including nondriven wheels and an engine having a fuel system for varying engine torque from a maximum torque value to an idle torque value, said method comprising in combination the steps of:

generating a characteristic signal representative of at least an estimate of the value of a traction characteristic of said surface under said vehicle;

generating a first decision signal if the value of said characteristic signal is increasing;

generating a second decision signal if the value of said characteristic signal is decreasing;

generating a first boundary signal representative of a first boundary value between a first range of values of a traction characteristic of said surface and a second range of values of said traction characteristic, the values in said second range being greater than the values in said first range;

generating a first band signal having a first predetermined band value less than said first boundary value;

generating a second band signal having a second predetermined band value greater than said first boundary value;

generating a drive signal having a value depending on a predetermined relationship among the values of said characteristic signal, first decision signal, second decision signal, first band signal and second band signal; and varying said engine torque in response to said drive signal, whereby the spin of said driven wheels is controlled while chattering is reduced.

2. A method, as claimed in claim 1, wherein the step of generating said drive signal comprises the steps of:

generating an initial control signal when the value of the characteristic signal falls within said first range of values;

adjusting the value of said drive signal so that said engine torque is reduced to said idle torque value in response to said initial control signal; and disabling the generating of said initial control signal so that said engine torque is reduced to said idle torque value only a limited number of times during an operating cycle.

3. A method, as claimed in claim 2, wherein the step of generating said initial control signal comprises the steps of:

comparing the value of said characteristic signal to the value of said first boundary signal; and generating said initial control signal if the value of said characteristic signal is less than the value of said first boundary signal.

4. A method, as claimed in claim 3, wherein said limited number of times is one.

5. A method, as claimed in claim 1, and further comprising the steps of:

generating a second boundary signal representative of a boundary value between said second range of values and a third range of values of said traction characteristic, the values in said third range being greater than the values in said second range;

generating a third band signal having a third predetermined band value less than said second boundary value;

generating a fourth band signal having a fourth predetermined band value greater than said second boundary value;

generating a first control signal corresponding to said first range of values in response to said first decision signal if said characteristic signal has a value less than said second band signal;

generating a second control signal corresponding to said second range of values in response to said first decision signal if said characteristic signal has a value greater than said second predetermined band value and has a value less than said fourth predetermined band value;

generating a third control signal corresponding to said third range of values in response to said first decision signal if said characteristic signal has a value greater than said second predetermined band value and has a value greater than said fourth predetermined band value; and calculating said drive signal at least in part from the value of one of said first, second or third control signals.

6. A method, as claimed in claim 5, and further comprising the steps of:

generating a fourth control signal corresponding to said first range of values in response to said second decision signal if said characteristic signal has a value less than said third predetermined band value and has a value less than said first predetermined band value;

generating a fifth control signal corresponding to said second range of values in response to said second decision signal if said characteristic signal has a value less than said third predetermined band value and has a value greater than said first predetermined band value;

generating a sixth control signal corresponding to said third range of values in response to said second decision signal if said characteristic signal has a value greater than said third predetermined band value; and calculating said drive signal at least in part from the value of one of said first, second, third, fourth, fifth or sixth control signals.

7. A method, as claimed in claim 6, wherein said first range of values represents a traction characteristic of ice, wherein said second range of values represents a traction characteristic of snow and wherein said third range of values represents a traction characteristic of gravel.

8. A method, as claimed in claim 7, wherein the absolute difference between the value of said first boundary signal and said first predetermined band value is substantially equal to the absolute difference between the value of said first boundary signal and said second predetermined band value.

9. A method, as claimed in claim 7, wherein the absolute difference between the value of said second boundary signal and said third predetermined band value is substantially equal to the absolute difference between the value of said second boundary signal and said fourth predetermined band value.

10. A method, as claimed in claim 9, wherein said fourth predetermined band value is greater than said third predetermined band value, wherein said third predetermined band value is greater said second predetermined band value and wherein said second predetermined band value is greater than said first predetermined band value.

11. A method of controlling the spin of driven wheels of a vehicle being driven over a surface, said vehicle also including nondriven wheels and an engine having a fuel system for varying engine torque from a maximum torque value to an idle torque value, said method comprising in combination the steps of:

generating a characteristic signal representative of at least an estimate of the value of a traction characteristic of said surface under said vehicle;

generating a drive signal having a value dependent on the value of said characteristic signal for a first range of values of said characteristic signal and independent of the value of said characteristic signal for a second range of values of said characteristic signal; and varying said engine torque in response to said drive signal, whereby the spin of said driven wheels is controlled.

12. A method, as claimed in claim 11, wherein said step of generating a characteristic signal comprises the steps of:

generating a torque signal representative of at least an estimate of the amount of torque or tractive force applied to said driven wheels;

generating a load signal representative of at least an estimate of the weight applied to said driven wheels;

dividing the value of said torque signal by the value of said load signal.

13. A method, as claimed in claim 11, wherein the step of generating said drive signal comprises the steps of:

generating a first speed signal representative of the angular speed of said driven wheels;

generating a second speed signal representative of the angular speed of said nondriven wheels;

generating a slip error signal responsive to said first speed signal, said second speed signal and the value of said characteristic signal;

generating a slip error derivative signal dependent on the derivative of said slip error signal and the value of said characteristic signal;

generating a slip error integration signal dependent on the integral of said slip error signal over a predetermined time period and the value of said characteristic signal; and adjusting the value of said drive signal in response to said slip error signal, said slip error derivative signal and said slip error integration signal.

14. A method, as claimed in claim 13, wherein the step of generating said drive signal comprises the steps of:

storing a first set of gain values corresponding to a first range of values of said traction characteristic;

storing a second set of gain values corresponding to a second range of values of said traction characteristic, some of the values in said second range being greater than the values in said first range;

storing a third set of gain values corresponding to a third range of values of said traction characteristic, some of the values in said third range being greater than the values in said second range;

selecting one of said gain values depending on the value of said characteristic signal; and calculating the value of said drive signal depending on the selected one of said gain values.

15. A method, as claimed in claim 13, wherein:

the step of generating said slip error signal comprises the step of multiplying said selected one of said gain values times a value proportional to the difference between said first and second speed signals;

the step of generating said slip error derivative signal comprises the steps of multiplying said selected one of said gain values times a value proportional to the derivative of said slip error signal; and the step of generating said slip error integration signal comprises the step of multiplying said selected one of said gain values times a value proportional to the integral of said slip error signal over a predetermined time period.

16. A method, as claimed in claim 15, wherein the step of generating said slip error signal comprises the steps of:

generating a slip signal proportional to the difference between the angular speed of said driven wheels and the angular speed of said nondriven wheels;

defining a desired slip signal corresponding to said ranges of values of said traction characteristics and proportional to a desired difference between the angular speed of said driven and said nondriven wheels; and generating said slip error signal proportional to the difference between the value of the slip signal and the value of the desired slip signal.

17. A method, as claimed in claim 14, wherein the step of generating said drive signal comprises the steps of:

generating an initial control signal when the value of the characteristic signal falls within said first range of values;

adjusting the value of said drive signal so that said engine torque is reduced to said idle torque value in response to said initial control signal;

disabling said step of adjusting the value of said drive signal in response to said slip error signal, said slip error derivative signal and said slip error integration signal; and disabling the generating of said initial control signal so that said engine torque is reduced to said idle torque value only a limited number of times during an operating cycle.

18. A method, as claimed in claim 17, wherein said limited number of times is one.

19. A method, as claimed in claim 17, and further comprising the step of generating a first boundary signal representative of a first boundary value between said first range of values and said second range of values and wherein the step of generating said initial control signal comprises the steps of:

comparing the value of said characteristic signal to the value of said first boundary signal; and generating said initial control signal if the value of said characteristic signal is less than the value of said first boundary signal.

20. A method, as claimed in claim 14, wherein said first range of values represents a traction characteristic of ice, wherein said second range of values represents a traction characteristic of snow and wherein said third range of values represents a traction characteristic of gravel.

* * * * *